United States Patent [19]

Ledoux

[11] Patent Number: 5,091,137
[45] Date of Patent: Feb. 25, 1992

[54] PIPE LINING PROCESS

[75] Inventor: Patrick R. Ledoux, New Orleans, La.

[73] Assignee: Pipe Liners, Inc., Metairie, La.

[21] Appl. No.: 616,926

[22] Filed: Nov. 21, 1990

Related U.S. Application Data

[62] Division of Ser. No. 298,754, Jan. 19, 1989, Pat. No. 4,998,871.

[51] Int. Cl.⁵ .................... B29C 63/38; B29C 53/08
[52] U.S. Cl. .................... 264/516; 138/97; 138/DIG. 5; 156/287; 156/294; 264/36; 264/230; 264/269; 264/521; 264/573
[58] Field of Search ............... 264/36, 512, 516, 230, 264/269, 570, 573, 521, 248; 138/97, 98, DIG. 5; 156/287, 293, 294, 94

[56] References Cited

U.S. PATENT DOCUMENTS

| | | | |
|---|---|---|---|
| 677,142 | 6/1901 | Richardson et al. | 72/175 |
| 2,423,260 | 7/1947 | Slaughter | 264/560 |
| 2,668,987 | 2/1954 | Harris et al. | 264/165 |
| 2,724,672 | 11/1955 | Rubin | 156/287 |
| 2,955,318 | 10/1960 | Cook et al. | 264/280 |
| 2,980,161 | 4/1961 | Howard | 264/145 |
| 3,192,612 | 6/1965 | Elliott et al. | 29/840.15 |
| 3,335,758 | 8/1967 | Bertolet, Jr. | 138/140 |
| 3,371,770 | 3/1968 | Graham et al. | 198/572 |
| 3,429,954 | 2/1969 | Atkins et al. | 264/22 |
| 3,543,334 | 12/1970 | Sudo | 425/71 |
| 3,560,295 | 2/1971 | Kimbrell et al. | 156/287 |
| 3,758,361 | 9/1973 | Hunter | 138/140 |
| 3,897,530 | 7/1975 | Leathers | 264/285 |
| 3,996,967 | 12/1976 | Takada | 138/97 |
| 4,020,136 | 4/1977 | Zaro | 425/388 |
| 4,028,037 | 6/1977 | Dawson | 425/392 |
| 4,207,130 | 6/1980 | Barber | 156/244.13 |
| 4,231,740 | 3/1982 | Davis et al. | 29/402.09 |
| 4,233,101 | 11/1980 | Scragg et al. | 156/287 |
| 4,273,605 | 6/1981 | Ross | 156/286 |
| 4,361,451 | 11/1982 | Renaud | 156/64 |
| 4,368,091 | 1/1983 | Ontsuga et al. | 156/287 |
| 4,377,894 | 3/1983 | Yoshida | 29/454 |
| 4,394,202 | 7/1983 | Thomas et al. | 156/94 |
| 4,410,391 | 10/1983 | Thomas et al. | 156/574 |
| 4,427,480 | 1/1984 | Kamuro et al. | 156/287 |
| 4,446,891 | 5/1984 | Gebelius | 138/97 |
| 4,483,167 | 11/1984 | Hayashi | 72/173 |
| 4,496,499 | 1/1985 | Brittain et al. | 264/36 |
| 4,504,171 | 3/1985 | Florence, Jr. | 405/154 |
| 4,627,471 | 12/1986 | Parkes et al. | 138/97 |
| 4,643,855 | 2/1987 | Parkes et al. | 264/36 |
| 4,650,703 | 3/1987 | Kleinheins . | |
| 4,691,740 | 9/1987 | Svetlik et al. . | |

FOREIGN PATENT DOCUMENTS

| | | |
|---|---|---|
| 682774 | 1/1966 | Belgium . |
| 1084224 | 8/1980 | Canada . |
| 0065886 | 1/1982 | European Pat. Off. . |
| 3519439 | 5/1985 | Fed. Rep. of Germany . |
| 1194226 | 11/1959 | France . |
| 1394807 | 3/1965 | France . |
| 2503622 | 10/1982 | France . |
| WO87/03840 | 7/1987 | PCT Int'l Appl. . |
| WO88/04987 | 7/1988 | PCT Int'l Appl. . |
| 807413 | 1/1959 | United Kingdom . |

(List continued on next page.)

Primary Examiner—Jan H. Silbaugh
Assistant Examiner—Mathieu Vargot
Attorney, Agent, or Firm—Nixon & Vanderhye

[57] ABSTRACT

A method is provided for lining a pipe wherein a thermoplastic liner is initially formed in a cylindrical shape with a diameter slightly larger than the internal diameter of the pipe. The liner is temporarily deformed at an elevated temperature to a different cross-section, preferably U-shaped, to reduce its overall cross-sectional dimension to facilitate insertion into the pipe to be lined. The deformation occurs with substantially comparable elongation of the pipe lining along its opposite sides thereby precluding variations in wall thickness and stress in the pipe. Once inserted, the liner is pressurized and reheated first to a temperature below its crystallization temperature to round the lining in the pipe and subsequently, further pressurized and reheated to a second temperature higher than the crystallization temperature to cause the liner to retain its original round shape.

7 Claims, 8 Drawing Sheets

FOREIGN PATENT DOCUMENTS

| | | |
|---|---|---|
| 1340068 | 12/1973 | United Kingdom . |
| 1352829 | 5/1974 | United Kingdom . |
| 1437273 | 5/1976 | United Kingdom . |
| 2003576 | 3/1979 | United Kingdom . |
| 1553408 | 9/1979 | United Kingdom . |
| 2018384 | 10/1979 | United Kingdom . |
| 1580438 | 4/1980 | United Kingdom . |
| 2080917 | 2/1982 | United Kingdom . |
| 2084686 | 4/1982 | United Kingdom . |
| 2094862 | 9/1982 | United Kingdom . |
| 2184194 | 6/1987 | United Kingdom . |
| 2186340 | 8/1987 | United Kingdom . |
| 2188695 | 10/1987 | United Kingdom . |

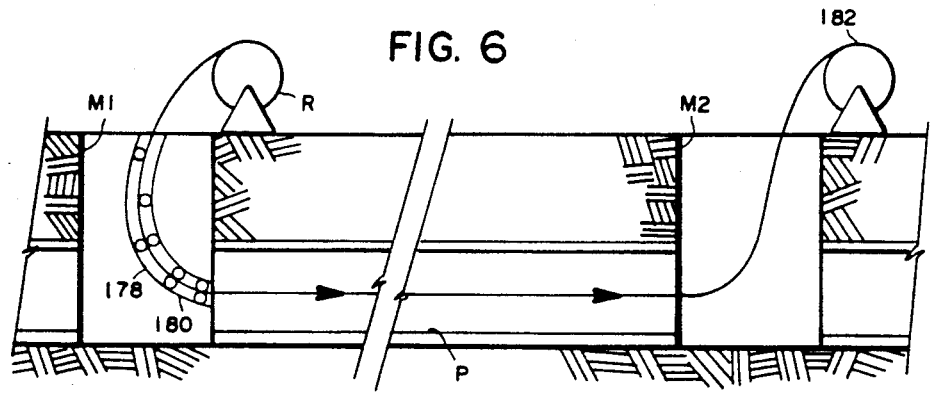
FIG. 6
FIG. 7
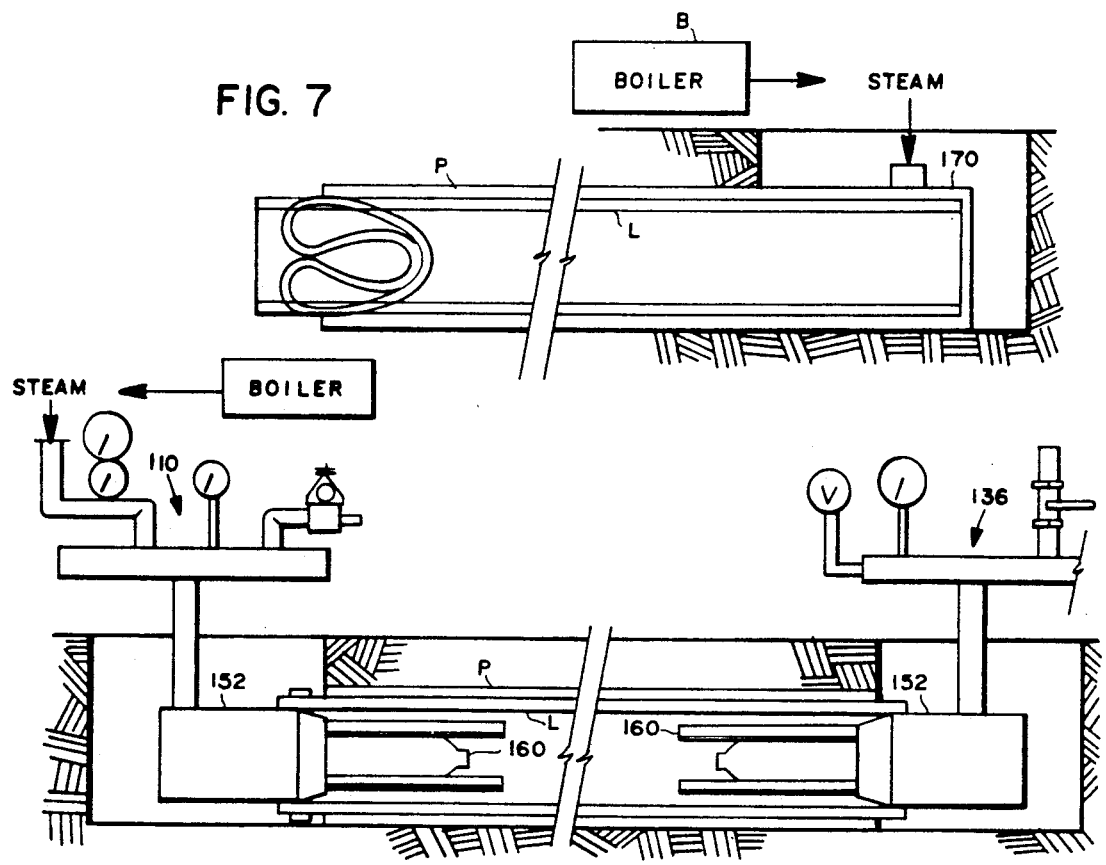
FIG. 8

PIPE LINING PROCESS

This is a division of application Ser. No. 07/298,754, filed Jan. 19, 1989, now U.S. Pat. No. 4,998,871.

RELATED APPLICATIONS

This application is related to U.S. patent application Ser. No. 114,949, filed Oct. 30, 1987, now U.S. Pat. No. 4,985,196, U.S. patent application Ser. No. 077,883, filed July 27, 1987, now U.S. Pat. No. 4,863,365, and U.S. patent application Ser. No. 188,468, filed Apr. 29, 1988, now U.S. Pat. No. 4,986,951, disclosures of which is incorporated herein by reference.

BACKGROUND OF THE INVENTION

This invention relates to thermoplastic liners for disposition within pipe lines, either initially or as a repair, for protecting the internal walls from deterioration. For deteriorated or damaged piping, the liner restores the fluid transport capability of the pipe and prevents further interior deterioration. One such liner for protecting the interior of pipe is taught by French Patent No. 2,503,622 dated Oct. 15, 1982.

It is a general object of this invention to provide methods and apparatus for the manufacture of a deformed tube product useful as pipe liners of the type disclosed in the Laurent patent, apparatus and methods for installing the pipe liner within the pipe, and a pipe liner product.

SUMMARY OF THE INVENTION

The present method of manufacturing a tubular pipe lining product involves a first step of extruding a pipe having a tubular cross-section, and a second step of deforming the extruded tube into a reduced cross-sectional shape for insertion into a pipe as a liner therefor. A feature of this method of manufacturing such tube product and its installation as a pipe lining is the use of thermoplastic material and its temperature and pressure control at the successive stages of formation during its deformation, and during its return to ambient usable condition upon installation into the pipe. It is an object of this invention to provide a method and apparatus for the manufacture of pipe lining in continuous deformed lengths as well as methods and apparatus for installing the lining into pipe for subsequently returning the lining in the pipe to its original, substantially unstressed, pre-deformed cross-section. In practice, the lining configuration before deformation has an outside diameter equal to or preferably slightly greater than the inside diameter of the pipe to be protected, whereby the lining is either unstressed or preferably under slight circumferential compression; either of which conditions is readily accommodated by the plastic lining which relies upon the surrounding pipe for its structural support.

It is another object of this invention to deform an initially extruded tubular cross-section without adverse effect on its structural integrity, and in such a manner that its initially extruded tubular cross-section can be restored. To this end, controlled heat is applied to establish a softened condition of the thermoplastic material after its extrusion, while simultaneously applying deforming tools thereto in order to reduce its cross-sectional configuration. When the desired reduction is achieved, heat is withdrawn and the finished product of continuous length is then wound on a spool for storage, transport and subsequent installation and reformation to its original tubular configuration.

While a U-shaped reduced tubular configuration is particularly shown and described, it is to be understood that other cross-sectional configurations may be used, whether they be H-shaped or X-shaped, or the like. The substantial U-shape of the lining hereof, which also embraces a V-shape, is presently considered to be the most practical and preferred configuration for such a tube product.

In carrying out this invention, the deformation of the initially extruded tube, preferably of cylinder form, progresses in a gradual manner, by shaping means. That is, at least one side of the tubular extrusion is increasingly depressed so as to condition the tubular extrusion for its lateral collapse into a reduced substantially U-shaped cross-sectional configuration symmetrical about a plane of bilateral symmetry passing through the axis of the previously round configuration; thus providing a deformed tube. As pointed out above, this deformation is conducted in the presence of controlled heat substantially below fluidity of the thermoplastic material and such that the plastic is deformed without adversely affecting its structural integrity or chemical nature, whether in its deformed condition or in its subsequently re-established initial condition.

The product herein disclosed is a thermoplastic pipe lining that is reduced from its initially extruded round cross-section, so that it can be easily pulled inside a pipe and then restored to its initially extruded cross-section. Assuming pipe to be lined is round in cross-section, the outside diameter of the initially extruded lining tube is the same or preferably slightly greater than the inside diameter of the pipe that receives it, so that the liner exterior comes into perfect interface contact with the pipe interior and preferably under slight circumferential compression. This interface contact of liner within and with the pipe eliminates any annulus therebetween, and consequently any requirement for filling such annulus. A feature of this liner is its thin-wall configuration made of a thermoplastic such as polyethylene, nylon, Teflon TM, ABS, or any other such plastic material, whereby the small loss of inside diameter of the flow passage is largely compensated for by the exceptional flow coefficient within the liner made of such a thermoplastic material. For new pipe line projects, expensive pipe materials such as stainless alloys can be substituted with ordinary steel pipe, and lined with this product liner, thereby realizing substantial cost savings, together with the improved fluid tolerance properties of the plastic which can be selected to best advantages. Accordingly, pipe lines which are structurally sound need not be replaced, since this lining product can be installed and replaced as circumstances require.

The method and apparatus herein disclosed for the manufacture of this lining product constitutes, in one aspect thereof, improvements to the methods and apparatus disclosed in the above-identified U.S. patent applications and involves improvements to the apparatus and methods of deforming the thermoplastic tubing after the tubular cross-section of the lining has been extruded.

In the methods and apparatus of deforming the linear according to the prior applications, it has been found that there is an elongation in an axial direction along the side of the deformed pipe which forms the legs of the substantially U-shaped configuration. That is in contrast to the substantial lack of elongation of the side of the pipe which is not substantially deformed, i.e., the outside wall or base of the substantially U-shaped pipe. The difference in elongation between these opposite sides of the pipe when the pipe is reformed into its generally tubular configuration results in a lack of uniformity of wall thickness and stresses about the circumference of the pipe. For lining pipes of 8-inch diameter or less, this resulting differential elongation does not cause particular problems because the pipe lining remains substantially within manufacturing tolerances and allowable stresses. However, for lining pipes larger than 8 inches in diameter, the difference in wall thickness and stresses about the reformed pipe lining may lie outside of these allowable tolerances and stresses. This problem is also exacerbated when a series of deforming rollers have large arcuately curved surfaces to effect the deformation into the substantially U shape of the pipe lining is used. That is, the angular speeds of the high and low points of the rollers are many times different than one another and their engagement with the material of the pipe therefore causes that material to flow due to the friction between the rollers and the pipe. This flow of material, particularly for pipe linings useful for large diameter pipes, i.e., larger than 8-inch, causes the formation of walls having different stresses and different thicknesses at different circumferential positions thereabout.

To minimize or eliminate this problem, and in accordance with the present invention, the tubular pipe is elongated on the side thereof opposite the folded or deformed side in order to achieve substantially equal elongation of the pipe along its opposite sides. A method of effecting this additional elongation according to the present invention resides in displacing one of the back-up rollers in a direction toward the axis of the pipe, i.e., toward a deforming roller, to induce an elongation in that side of the pipe comparable to the elongation of the opposite deformed side of the pipe lining. In this manner, the resulting wall thickness and the stresses about the wall will be substantially uniform when the pipe is deformed and when reformed back to its original tubular shape in use. Consequently, for those pipe linings formed by using the system of the disclosures set forth in the above-identified U.S. patent applications, a back-up roller is mounted for movement toward and away from the axis of the pipe to induce the elongation along that side of the pipe. For pipe linings useful to line pipes of 8 inches or less in diameter, such solution brings the wall thickness and stress tolerances closer to acceptable standards. However, for lining pipes of large diameter, the problem of inducing flow of the plastic material during deformation remains.

In accordance with another aspect of the present invention, there is provided an apparatus and method for deforming a pipe lining useful for lining large diameter pipes, i.e., greater than 8 inches, wherein substantially equal stresses and elongation are introduced into the pipe about its circumference to achieve uniformity of wall thickness and stresses in the deformed pipe. While this apparatus and method may be used for deforming pipe lining for use with 8-inch or less diameter pipes, because of the present invention's capacity to substantially equalize the wall thickness and stresses circumferentially about the lining which otherwise may cause problems in the larger pipe sizes, it is preferably used for larger diameter pipe. More particularly, the pipe lining apparatus may comprise a pair of fixed positioning rollers mounted 90° apart for receiving tubular pipe from the extruder. A pair of adjustable positioning rollers are mounted opposite the fixed positioning rollers. The adjustable positioning rollers are mounted for pivotal movement about axes normal to one another and suitable sensors are provided to sense the angular position of each of the adjustable positioning rollers and provide a signal in response thereto to a control, including a computer.

Downstream of the positioning rollers, there is provided on one side of the pipe a deforming wheel or roller which is motor-driven, mounted on an axis normal to the axis of the pipe line such that the wheel or roller can be displaced about such axis toward and away from the pipe by means of a power, preferably hydraulic, cylinder. The roller has a hollow rim for receiving a heating fluid. Generally opposite the deforming roller on the opposite side of the pipe is a movably positioned back-up or supporting roller mounted for movement toward and away from the axis of the pipe. Downstream of the deforming and support rollers, there is provided a rail mounted for movement toward and away from the pipe by a power cylinder for insertion between the legs of the deformed pipe. Substantially opposite the rail on the opposite side of the pipe is a supporting roller mounted for movement toward and away from the pipe. Additionally, two pairs of closing rollers are axially spaced one from the other and engageable with the legs of the generally U-shaped pipe to maintain the latter in its deformed condition.

In operation, the pipe is received between the positioning rollers and its diameter is ascertained by the sensors on the adjustable positioning rollers. The sensors provide a signal indicative of the diameter to the computer. The computer signals the drive mechanism for the supporting rollers to position them to elongate the side of the pipe opposite its deformed side such that the resulting pipe will have substantially uniform elongation when deformed and, consequently, uniform wall thickness and stresses about its circumference. The signal indicative of the pipe diameter is also input to the computer to provide an electrical output signal to actuate the power cylinder to pivot the deforming roller toward the pipe to a predetermined position dependent upon the degree of deformation required for that particular diameter pipe lining. The hollow rim of the wheel is heated by flowing hot water or oil in it to a temperature which corresponds to the temperature of the remaining circumference of the pipe in the region of its deformation in order that the legs of the U-formed pipe, once formed, will not tend to move away from one another. The mass of plastic material should be maintained in the region of deformation within a temperature range of 200° to 240° F., i.e., about or higher than the crystallization melting temperature of the material forming the liner. Therefore, after initially heating the deforming roller, the pipe lining is deformed by the cooperation of the deforming and supporting rollers and subsequent downstream rollers, to be described. During deformation, the pipe is maintained at a temperature about or above its crystallization melting temperature. In this manner, the pipe will retain its deformed shape while remembering its round shape.

Downstream of the deforming roller, the rail is also positioned in accordance with the diameter of the pipe to bear against the fold at the plane of bilateral symmetry. One set of angled supporting rollers engages the side double-walled sections or lobes forming the legs of the U-shaped lining to maintain those legs in a partially closed position about the rail. Downstream of the rail and the first set of supporting rollers, a second set of supporting rollers bears against those side sections to substantially maintain the side sections in contact one with the other. The movement of the supporting rollers toward the deforming roller in accordance with the diameter of the pipe to be deformed enables a comparable elongation of the pipe on the side opposite the deformed side thereof to maintain uniformity of wall thickness and stresses about the circumference of the lining.

As will be recalled from a review of the prior U.S. patent applications identified above, there is a crystallization melting point for plastic materials for forming pipe linings. For example, the crystallization melting temperature for high-density polyethylene is about 235° F. or 113° C. In accordance with those disclosures, the pipe lining is deformed at a temperature at or slightly above this crystallization melting temperature. Attempts to deform the pipe at a temperature too far above the crystallization melting temperature may result in the loss of the shape memory of the material forming the liner, i.e., HDPE, to return to its original cylindrical cross-sectional configuration or round shape. Deforming the pipe lining at a temperature lower than the crystallization melting point, however, results in a tendency for the pipe to move away from its deformed generally U-shaped and to return to its round shape. Thus, temperature control is somewhat critical in deforming and reforming pipe lining formed of a single material, such as HDPE.

In accordance with another aspect of the present invention, it has been found that by mixing a blend of plastic materials, i.e., high-density polyethylene and low linear density polyethylene, the blend has two discrete and different crystallization melting temperatures. For example, it has been found that with a 50-50 blend by weight of HDPE and LLDPE, the two crystallization melting points are on the order of about 105° and 113° C. If the pipe is heated to a temperature in that range of about 105° to 113° C., it has been found that the pipe will retain its original shape memory, i.e., round-shaped, upon deformation, while simultaneously the pipe will maintain itself in its deformed shape for temperatures below that range. Upon reheating to an activation temperature within that range, the pipe will recall its original round shape, return to it, and substantially lose any tendency to return to its deformed shape. That is, substantially any memory of its deformed shape will be erased. It will therefore be appreciated that the range of temperatures between the two discrete crystallization temperatures may vary depending upon the materials used and their proportions, although preferably such range may lie within about 5°-15°. Consequently, precise temperature control is not as critical when using a blend of plastic materials as compared with the temperature control necessary when using a single material, i.e., pure HDPE.

In accordance with another aspect of the present invention, there is provided improved methods and apparatus for the installation of the deformed pipe lining into the pipe. Thus, according to the present invention, the lining is inserted into the pipe in accordance with the procedures outlined in the prior U.S. patent applications. When manifolds have been disposed on the opposite ends of the pipe, and the ends of the lining have been mechanically expanded to initiate expansion of the liner as well as sealed, the process for reforming the liner to its round shape in accordance with the present invention may proceed. Preferably, steam is initially provided to the pipe lining at a temperature above the crystallization melting temperature of the plastic material forming the pipe lining, i.e., a steam temperature of 240° F. for HDPE and also at a pressure of 10 psig. This steam temperature and pressure is maintained for a predetermined time to initially inflate or reform the deformed, generally U-shaped lining back to its round shape. However, the average temperature of the plastic material of the pipe lining during this reformation remains below its crystallization temperature. By reforming the pipe lining at an average pipe lining temperature below its crystallization melting temperature, circumferential elongation of the plastic material resulting in portions of the liner projecting radially inwardly and not bearing against the surface of the pipe wall is avoided. In short, the temperature and pressure in this first stage of reforming the liner are maintained sufficiently to render the lining substantially round.

After a predetermined time has evolved, the steam temperature is raised to a temperature of about 260° F.-265° F. to obtain a temperature in the plastic material on average at or above the crystallization temperature for that material. The pressure is also raised to and maintained at approximately 25 psig, dependent upon the wall thickness and ambient conditions. When the temperature of the lining as determined by a thermocouple applied to the steam injection end of the pipe has reached the desired temperature above the crystallization temperature and the temperature at the second end of the lining as sensed by a second thermocouple reaches a predetermined percentage, i.e., about 70%, of the temperature of the plastic material at the first end, the cool-down period is started. It has been determined that if a predetermined percentage of the mass of the plastic materials reaches the crystallization melting temperature, the U-shaped memory of the plastic material is essentially erased and the memory of the material for its original round shape is returned whereby the lining will adhere to the interior walls of the pipe. Thus, when the thermocouples sense these temperatures, the computer generates a signal which cuts off the steam supply and commences the injection of air into the lining. During the cool-down period, the pressure, however, is maintained elevated, i.e., at about 25 psig. The air thus cools the pipe lining to a third predetermined temperature approximately 200° F., at which time water is injected into the pipe lining to complete the cooling process. The pressure, however, is maintained at the elevated pressure of 25 psig until the pipe lining achieves a temperature which is a predetermined percentage of ambient at which time the cool-down period is complete. The cool-down temperature and pressure is maintained such that the plastic materials will not shrink or change their chemical integrity.

In a preferred embodiment according to the present invention, there is provided an elongated hollow pipe liner having a cross-sectional shape in the general form of a U and formed of a blend of high-density polyethylene and low linear density polyethylene.

In a further preferred embodiment according to the present invention, there is provided a method of deforming an elongated pipe lining from a generally round cross-sectional configuration to a generally U-shaped configuration, comprising the steps of forming a round pipe from a blend of high-density polyethylene and low-density polyethylene, thereby to provide a pipe having two discrete and different crystallization melting temperatures, heating the pipe to a temperature within the temperature range and mechanically deforming the pipe from the round configuration into the generally U-shaped configuration while maintaining the temperature within the range. The heat applied to the pipe is then removed to reduce the temperature thereof whereby the pipe will remain in a generally U-shaped configuration while retaining a memory of the round configuration.

In a still further preferred embodiment according to the present invention, there is provided a method of installing a thermoplastic liner in a generally cylindrical pipe, comprising the steps of providing a liner formed of thermoplastic material having a non-cylindrical cross-sectional shape with its largest cross-sectional dimension of a value smaller than the inside diameter of the pipe and having a shape memory of a generally cylindrical shape, the liner being responsive to a shape memory activation temperature above the crystallization melting temperature of the thermoplastic liner whereby the liner may be maintained in a generally cylindrical configuration, pulling the non-cylindrical liner into the pipe such that it extends to the opposite ends of the pipe, heating the non-cylindrical liner to a first temperature below said activation temperature, pressurizing the non-cylindrical liner to a first pressure to cause the liner to assume a generally cylindrical cross-sectional configuration generally conformal to the interior contours of the pipe when the liner is heated and is at a temperature below the activation temperature and holding the liner at the first temperature and the first pressure for a predetermined time period. The temperature in the liner is increased to a second temperature above the activation temperature and the pressure in the liner is increased to a second pressure above the first pressure to cause the liner to maintain its generally cylindrical shape. The liner is then cooled to a temperature below the activation temperature and the second pressure is removed from the liner whereby the liner maintains its generally cylindrical shape.

In a still further preferred embodiment according to the present invention, there is provided an apparatus for producing a deformed pipe lining from a tubular pipe having a longitudinal axis and formed of a plastic material, comprising at least one rotatable backup roller disposed on an axis parallel to an axis of, and generally in opposition to, at least one rotatable pipe lining shaping roller, the backup roller having a periphery generally centered at a plane of bilateral symmetry and adapted to engage a backup portion of the tubular pipe. The shaping roller has a perimeter disposed generally on the plane of bilateral symmetry so that when the tubular cross-section passes generally between the backup and shaping rollers, a deformable portion of the tubular cross-section is depressed generally diametrically toward the backup portion thereof and substantially along the plane of bilateral symmetry, so that opposite side sections of the tubular cross-section bend into double wall configurations with a fold thereof juxtaposed to the opposite backup portion of the tubular cross-section, so that the cross-sectional configuration of the tubular portion is altered and reduced. Means are provided for deflecting a portion of the tubular pipe opposite the deformable portion of the pipe inwardly toward the axis of the pipe and generally along the plane of symmetry thereof such that the deflected and deformed portions of the pipe have generally similar elongation.

In a still further preferred embodiment according to the present invention, there is provided an apparatus for mechanically reforming an end of a pipe having a generally U-shaped cross-section into a generally cylindrical configuration comprising a tool body of generally frustoconical configuration, means defining a generally concave recess within the body extending from one side of the reduced end of the frustoconical body arcuately toward the opposite side thereof and toward the opposite end of the body and a pair of rods spaced laterally one from the other and extending generally along the opposite side of the body for insertion into the legs of the generally U-shaped pipe.

Accordingly, it is a primary object of the present invention to provide novel and improved methods and apparatus for manufacturing a deformed pipe lining, and installing the pipe lining in a pipe as well as to provide a novel and improved pipe lining product.

Other objects and advantages will become apparent from the detailed description of the invention which follows.

BRIEF DESCRIPTION OF THE DRAWINGS

FIGS. 6–8 are more detailed schematic illustrations of the method of installing a deformed pipe liner according to the present invention;

DESCRIPTION OF THE PREFERRED EMBODIMENTS

Figure 1:
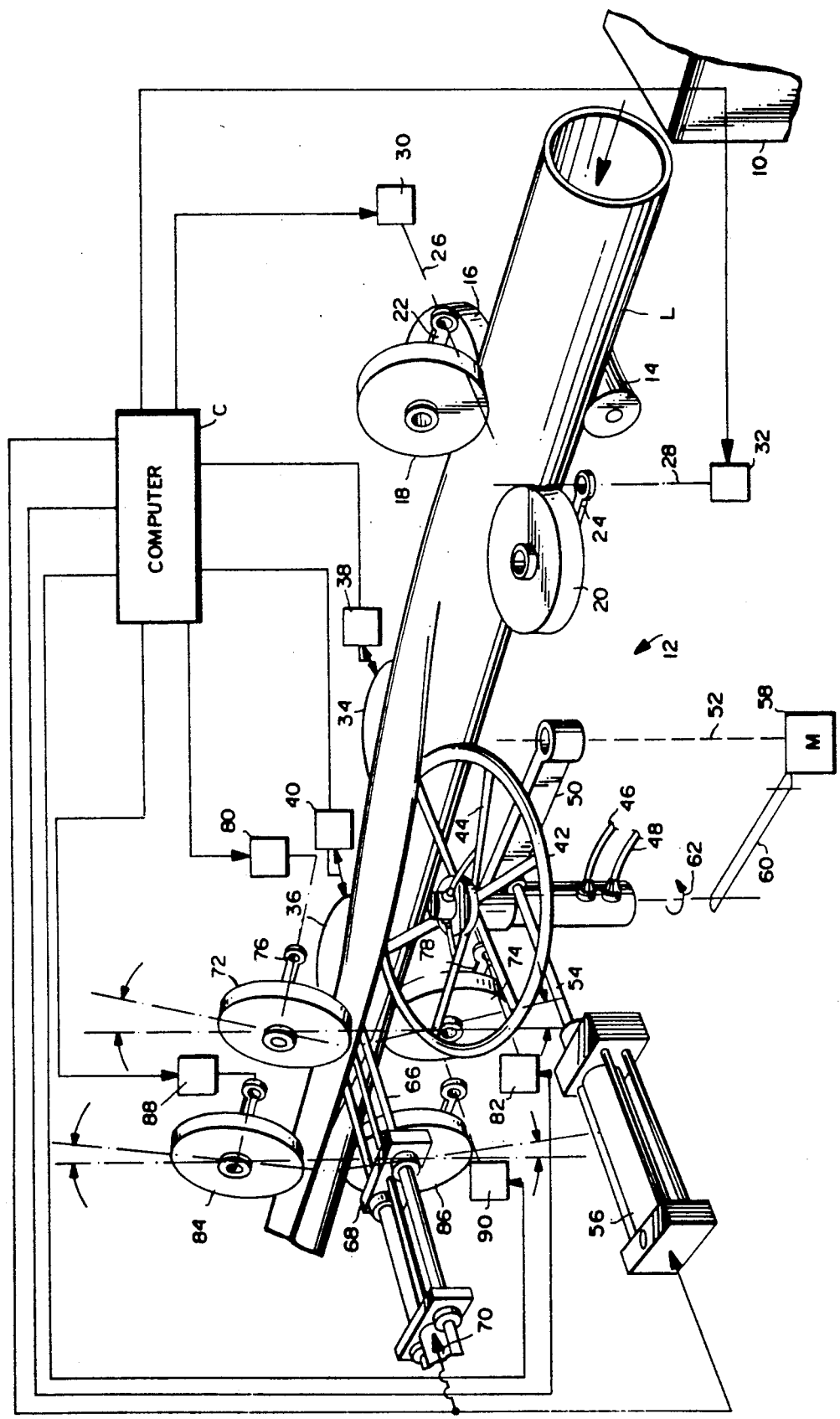
FIG. 1 is a perspective view of a tubular pipe deforming apparatus for manufacturing deformed pipe lining constructed in accordance with the present invention.
Figure 2:
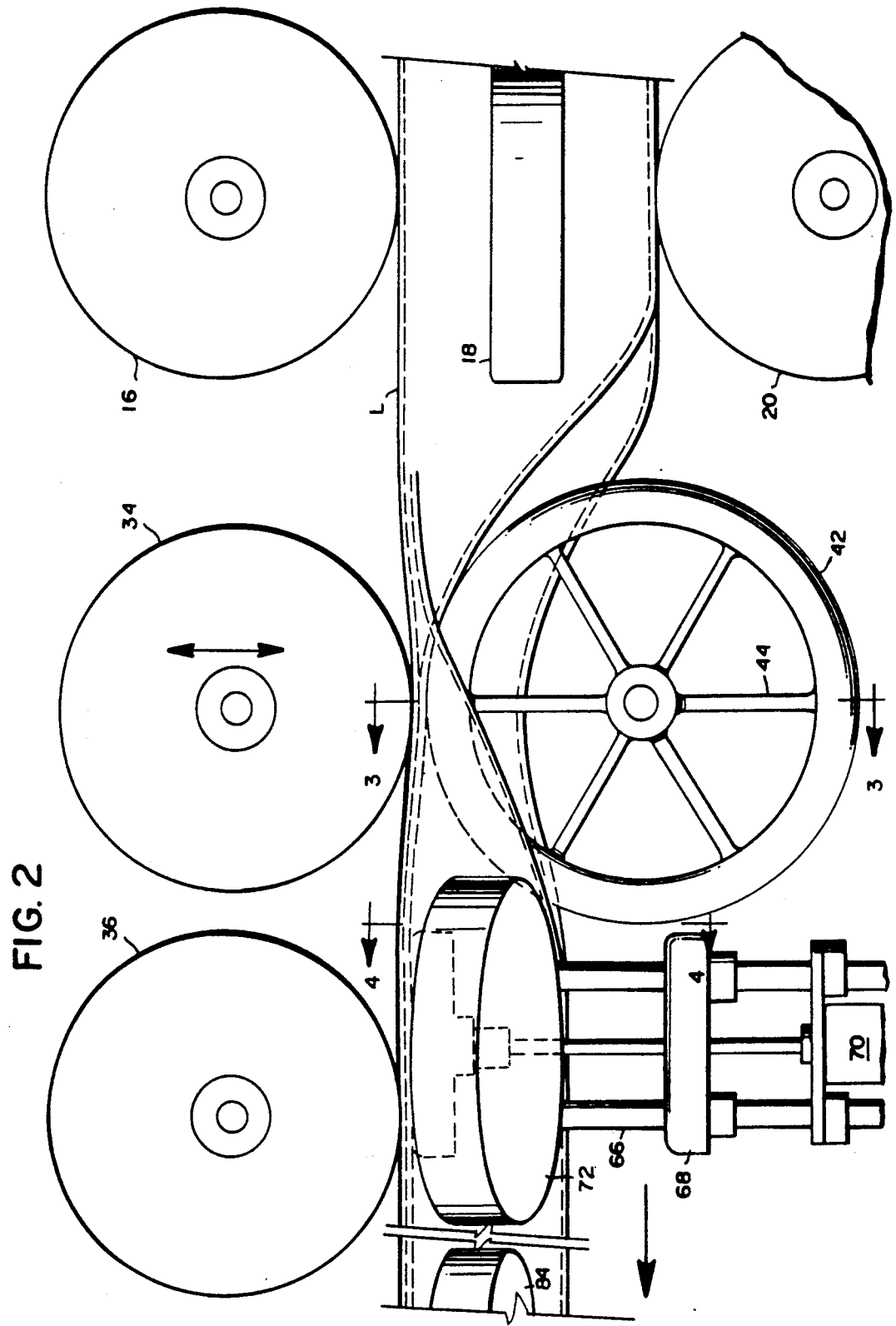
FIG. 2 is an enlarged top plan view of a portion of the deforming apparatus of FIG. 1.

Referring now to the drawings, it will be appreciated that the present invention is concerned with the deformation of a substantially cylindrical or round tube formed of a thermoplastic material extruded in continuous lengths into a generally U-shaped deformed condition such that its largest cross-sectional dimension is reduced in value for insertion in its deformed state into a pipe to be lined. Thereafter, the deformed pipe lining is reformed or reinflated into its round condition to engage the interior walls of the pipe forming a reconstituted pipe line.

According to the present invention, the pipe liner L is initially extruded by an extruder 10 to an exterior diameter at least as large and preferably slightly greater than the interior diameter of the pipe into which it is to be inserted. A feature of the present invention resides in the improved apparatus and methods for deforming the pipe liner L to decrease its cross-sectional configuration for storage on a reel and to facilitate its insertion into a pipe. Characteristic of the apparatus and methods for deforming the pipe in accordance with this first aspect of the present invention is that the pipe liner is elongated or stressed equally on both sides of the pipe such that substantially uniform wall thickness and stresses are achieved about the circumference of the lining.

Referring more particularly now to FIG. 1, the extruder 10 is followed by a cooling means, not shown, that delivers the lining L in tubular form into a deforming apparatus, generally designated 12. Following the deformation, the deformed liner product is then delivered through a second cooling means, also not shown, to provide liner product at ambient temperature for delivery through a puller, not shown, onto a storage spool, not shown in FIG. 1. For present purposes, it will be appreciated that the liner L is supplied to the deforming apparatus 12 at a uniform temperature approximating or above its crystallization melting temperature, i.e., 235° F. for HDPE. Deforming apparatus 12 includes a pair of fixed positioning rolls 14 and 16 located 90° one to the other and a pair of adjustable positioning rollers 18 and 20, located 90° one to the other and opposite rollers 14 and 16, respectively. The adjustable rollers 18 and 20 are mounted on arms 22 and 24, respectively, for rotation about axes 26 and 28 which, as illustrated, are 90° apart. The arms and, hence, the adjustable rollers 18 and 20, are driven by respective suitable drive mechanisms 30, 32, under control of a computer C, as will be described. The angular position of the rollers 18 and 20 is also sensed and a signal proportional to the sensed diameter is provided computer C. Positioning rollers 14, 16, 18 and 20 also establish the axial centerline of liner L as it passes through the deforming apparatus 12, as well as provide computer C with the diameter of the extruded pipe.

Downstream of the positioning apparatus in the direction of axial pipe movement, there is provided a pair of axially spaced back-up or supporting rollers 34 and 36. Each of rollers 34 and 36 is mounted for movement toward and away from the axis of the liner L by suitable means, not shown, for example, by suitable slides under control of a powered unit 38 and 40.

On the opposite side of pipe lining L, there is provided a deforming or penetration wheel or roller 42. Roller 42 preferably has a hollow rim which communicates with a hub through a series of hollow spokes 44 for the transmission and return of a heating fluid to the rim, whereby the roller 42 may be heated to approximately the temperature of the plastic material constituting the liner L passing that station. Suitable fluid inlet and exhaust lines are illustrated at 46 and 48, respectively. The roller 42 is mounted on an arm 50 which is pivotally mounted at one end for pivotal movement about an axis 52. Coupled to arm 50 is the piston rod 54 of a power cylinder 56, preferably hydraulic, whereby arm 50 and, consequently, wheel 42 carried thereby, may be displaced toward and away from liner L about axis 52. Suitable structure, not shown, carries a motor, either a DC drive or hydraulic motor, designated 58 for driving a pulley arrangement 60 whereby roller 42 may be rotated in the direction of the arrow, designated 62. Thus, when roller 42 engages liner L and is rotated, it tends to displace liner L in the downstream direction away from extruder 10.

Downstream of deforming roller 42, there is provided a rail 64 (FIG. 4) carried at one end by suitable telescoping rods 66 mounted in guides 68. Rail 64 is under the control of a power cylinder 70, preferably hydraulic. The position of rail 64 is controlled by computer C in accordance with the diameter of the pipe passing through the deforming apparatus 12.

A pair of support rollers 72 and 74 are mounted on opposite sides of the liner L generally similarly to positioning rollers 14 and 18. However, rollers 72 and 74 are rotatable in planes which are slightly angled or offset from a common plane through liner L such that their axes of rotation diverge to one side of the liner L, i.e., the side of the liner having a generally semi-cylindrical configuration. Rollers 72 and 74 are also mounted on arms 76 and 78, respectively, and suitable powered mechanisms 80 and 82 are provided arms 76 and 78 such that the supporting rollers 72 and 74 may be moved toward and away from the liner L and retained in adjusted positions relative thereto.

Downstream of rail 64, there is provided another pair of supporting rollers 84 and 86, respectively, similarly angled relative to liner L as rollers 72 and 74, but to a slightly lesser degree. Rollers 84 and 86 are also mounted on arms carried for movement under the control of suitable powered mechanisms 88 and 90, respectively, whereby the rollers 84 and 86 can be moved toward and away from liner L and be retained in adjusted positions relative thereto.

Figure 3:
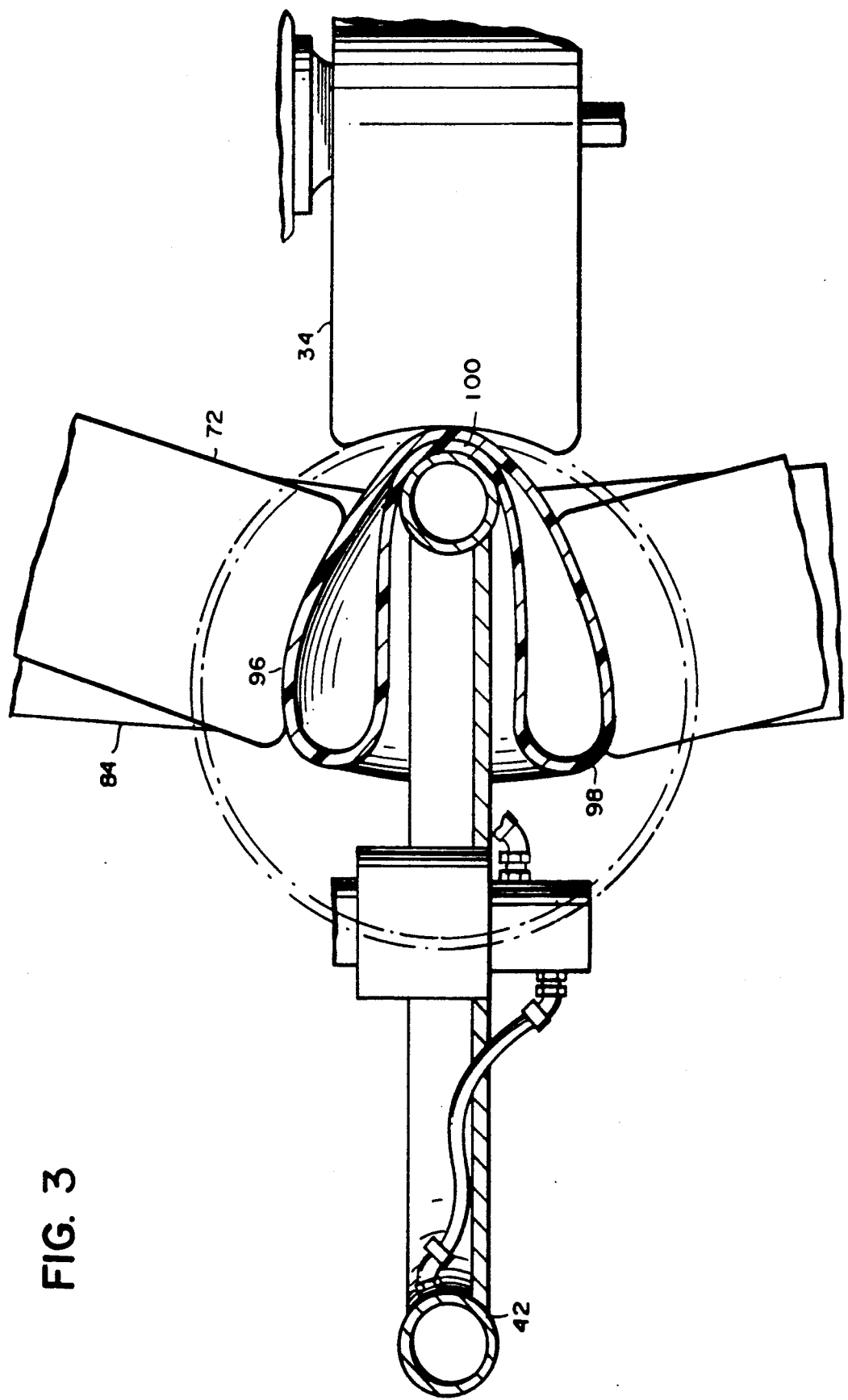
FIGS. 3 and 4 are cross-sectional views thereof taken generally about on lines 3—3 and 4—4 in FIG. 2.

To deform the pipe using deforming apparatus 12, tubular liner L is disposed through positioning rollers 14, 16, 18 and 20. The adjustable positioning rollers 18 and 20 are driven into engagement with the surface of liner L, their angular position is sensed and a signal is provided to the computer which is indicative of the diameter of the pipe. Using that information, the computer provides output signals to various downstream drive mechanisms to locate the driven parts thereof in appropriate position for that given diameter. For example, the computer C signals the positioning devices 38 and 40 to drive rollers 34 and 36 toward the liner axis into a position such that the side of liner L engaged by rollers 34 and 36 will be elongated comparable to the elongation afforded on the opposite side of the liner by deforming roller 42. Similarly, computer C signals hydraulic cylinder 56 to displace deforming wheel 42 about axis 52 into the path of movement of liner L, for example, to the extent illustrated in FIG. 3. It will be appreciated that when the liner L passes between the deforming roller 42 and backup or supporting roller 34, the liner is folded about a bilateral plane of symmetry through the axis of the tubular liner to form opposite arcuate side sections or lobes 96 and 98 (FIG. 3) on opposite sides of the plane of symmetry which also bisects the apex 100 of the fold imparted to the liner by deforming roller 42. Additionally, heating fluid supplied the rim of deforming roller 42 brings its temperature into correspondence with the temperature of the mass of plastic material of the liner L during deformation. In this manner, the temperature of liner L is maintained substantially uniform during the deforming process. It will be appreciated from a review of FIG. 3 that the side sections or lobes 96 and 98 collapse or fold about wheel 42 and that the liner is therefore transformed from its generally tubular or cylindrical configuration illustrated by the dot-dashed lines in FIG. 3 to a generally U-shaped configuration.

The deforming process is continued as the liner L emerges from between deforming roller 42 and backup roller 34 by means of the paired rollers 72, 74 and 84, 86.

Figure 4:
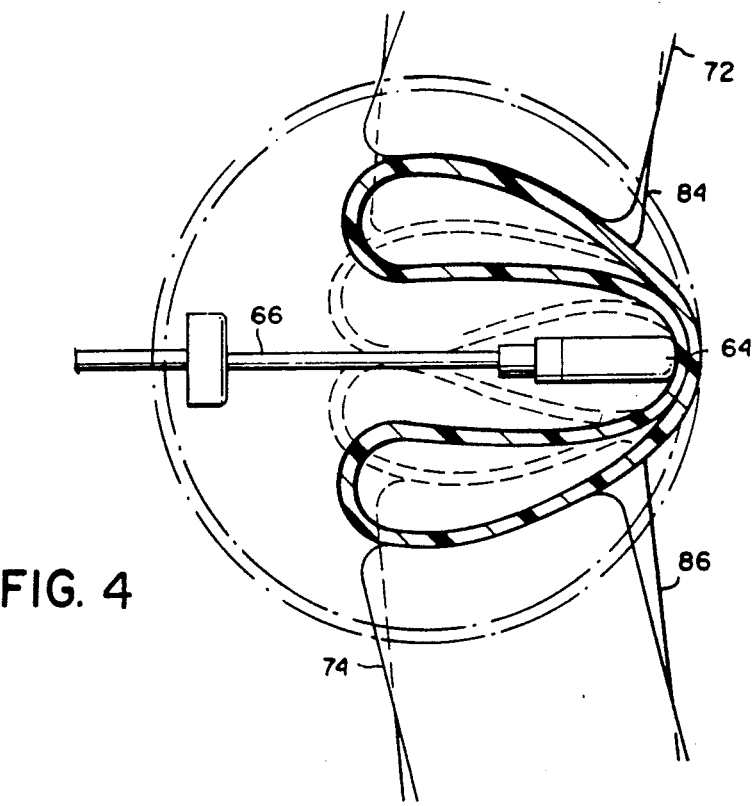

More particularly, the first pair of rollers 72 and 74 are angled (FIGS. 3 and 4) toward the open side of the U-shaped liner and continue the bending or folding process, deforming the roller about rail 64, as illustrated in FIG. 4. Rail 64 is formed of suitable material, such as Teflon, so that liner L may readily slide past rail 64. Once past rail 64, the second pair of rollers 84 and 86 are employed to substantially close the lobes 96 and 98 one against the other, as illustrated by the dashed line configuration in FIG. 4. Thus, by maintaining the temperature of the plastic material of liner L at or above the crystallization melting temperature of the material forming the lining, and gradually folding the liner into its general U-shaped configuration, the lining will maintain itself in that configuration upon cooling, while retaining the shape memory of its previous round or cylindrical configuration. Consequently, the deformed, generally U-shaped, liner L, after being cooled, will be wound on a spool, with the U-shaped configuration on its side when the spool is wound about a horizontal axis.

Figure 9:
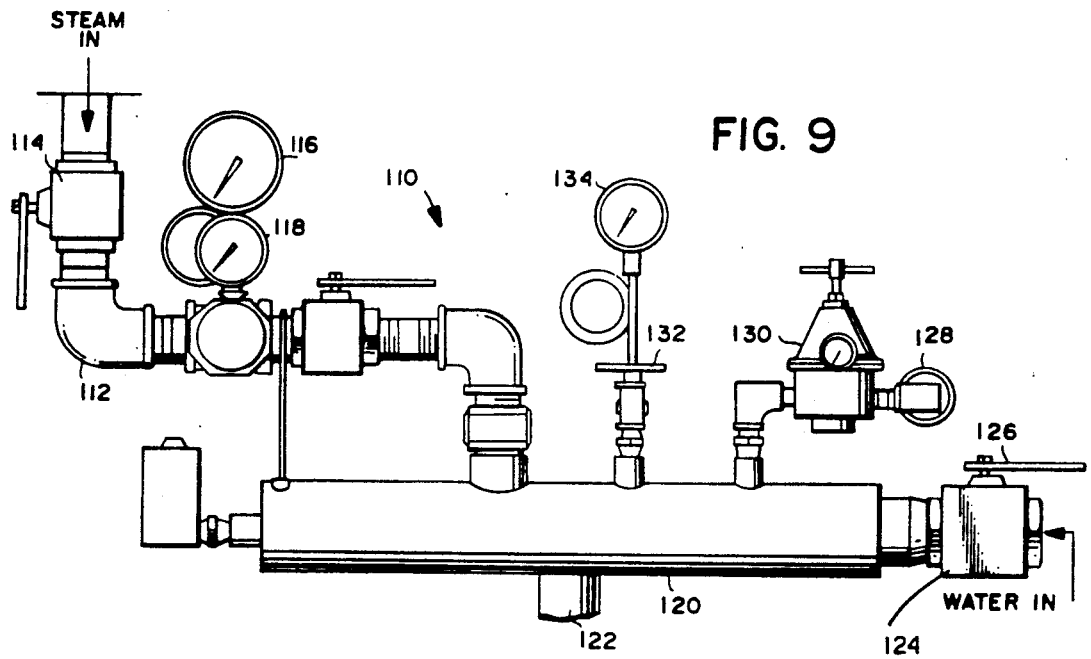
FIGS. 9 and 10 are side elevational views of injection and exhaust manifolds, respectively, used in connection with the pipe lining process illustrated in FIGS. 5–8.

Before describing the process of installation of the generally U-shaped lining in a pipe as illustrated in FIGS. 5–8, certain tools used in connection therewith including injection and exhaust manifolds, together with the re-rounding tool, plug and end injector will be described. Referring now to FIG. 9, an injection manifold, generally designated at 110, includes a steam inlet line 112 with a suitable valve 114, as well as temperature and pressure gauges 116 and 118, respectively. The steam line connects with a manifold body 120, which, in turn, has an outlet 122 for flowing steam into liner L in a manner to be described. At one end of manifold body 120, there is a water inlet 124 with an associated valve 126. An air inlet line 128 is connected to manifold body 120 by an air pressure regulator 130. Manifold pressure and temperature gauges are also provided at 132 and 134.

Figure 10:
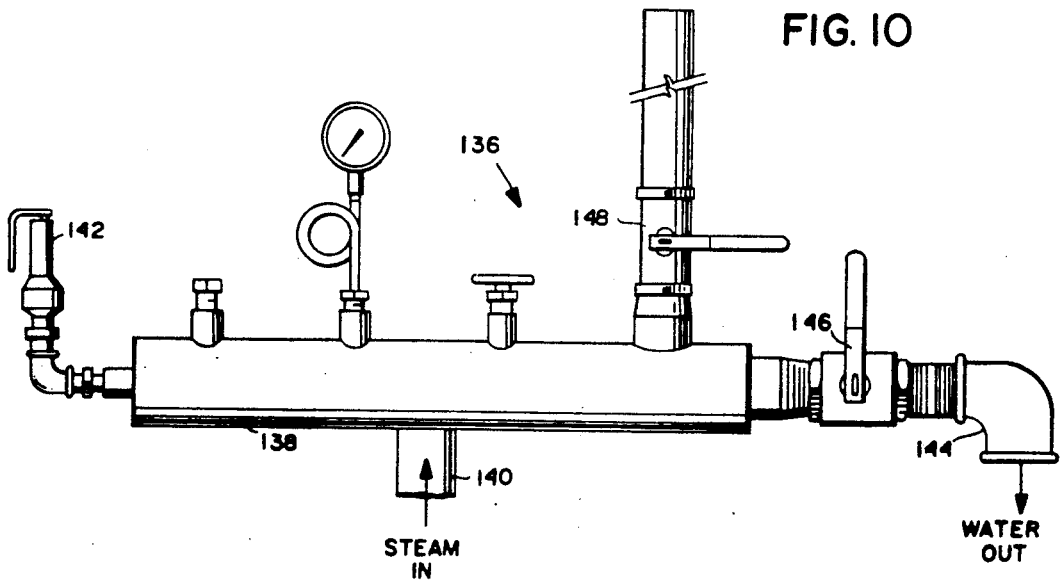

With respect to FIG. 10, the exhaust manifold, generally designated 136, includes a manifold body 138 having an inlet 140 for connection with the opposite end of the liner in a manner to be described. At one end of the manifold body 138, there is a pressure relief valve 142 and, at its opposite end, a water outlet 144 and valve 146 therefor is provided. An air pressure relief valve 148 is also provided.

Figure 11:
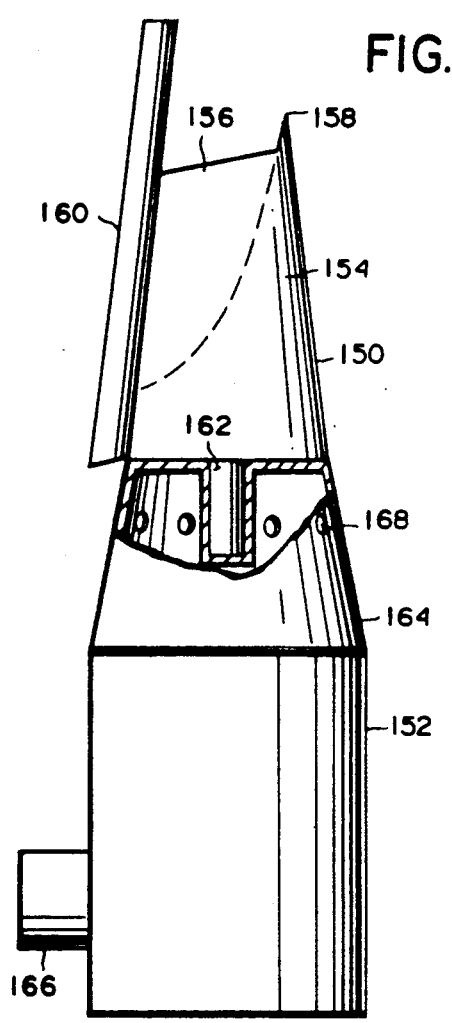
FIG. 11 is a side elevational view of a re-rounding tool joined with a plug for use in the method of installation disclosed in FIGS. 5–8.
Figure 12:
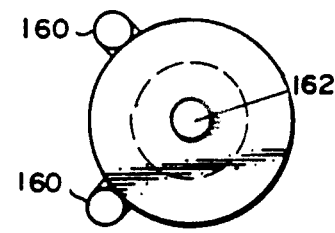
FIG. 12 is an end elevational view of the re-rounding tool illustrated in FIG. 11.

Referring to FIG. 11, there is illustrated a combined re-rounding tool 150 and plug 152. The re-rounding tool includes a generally frustoconically shaped nose 154 having a concave cutout 156 opening through the smaller diameter end thereof and tapering from a sharp point 158 on one side thereof to the opposite side. The concave cutout 156 is designed to accommodate the nearest walls of lobes 96 and 98 of the generally U-shaped liner when re-rounding tool 150 is inserted into the end of the deformed liner for purposes of initiating expansion thereof into its round shape. On the opposite side of re-rounding tool 150 from tip 158, a pair of laterally spaced rods or bars 160 are provided for insertion into the lobes 96 and 98, respectively, of the generally U-shaped liner. Bars 160 taper from the large diameter end of the frustoconical re-rounding tool towards its foreshortened end. The base of the re-rounding tool 150 includes a pin 162 for reception in a like opening in a plug 152. Plug 152 is substantially a hollow cylinder having a tapered portion 164 adjacent one end. A steam inlet 166 is provided on the side of plug 152 for flowing steam into the interior of plug 152. Outlets 168 are formed in the tapered side walls of plug 152 for communicating steam into the liner about the re-rounding tool, in a manner and for reasons which will be described.

Figure 13:
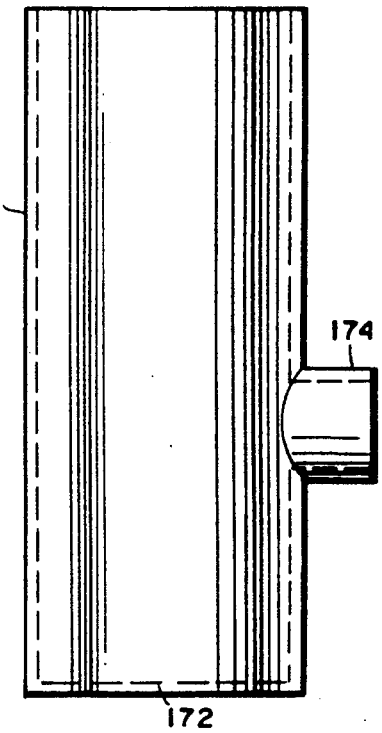
FIG. 13 is a side elevational view of an end ejector useful in the process illustrated in FIGS. 5–8.

Referring now to FIG. 13, there is illustrated an end injector 170. Injector 170 comprises a cylindrical section closed at one end at 172 and having a side inlet opening 174 for receiving steam.

Referring back to FIGS. 5–8, there is illustrated a pipe to be lined, for example, a sewer pipe P, disposed between manholes M1 and M2. To start the relining process, the sewer line is first cleaned and inspected by conventional means and repairs, as necessary or possible are made to the pipe. Pipe lining L is shipped on a spool to the contractor's facility in a premeasured length in excess of the length of the pipe between manholes M1 and M2. At the contractor's facility, the pipe is transferred to a motorized trailer-mounted reel R for transport to the lining site. At manhole M1, motorized reel R is set up such that the liner may issue from the top of reel R. A curved guide 178 having a plurality of rollers 180 is positioned in manhole M1 to guide liner L during its insertion into pipe P. A pulling winch 182 is disposed at the second manhole M2. A pulling line is disposed through sewer pipe P by conventional methods using a jet cleaner or a sewer parachute advanced by air. The pulling line is attached to the liner and the liner is inserted into pipe P by actuating the winch 182 to pull and motorized reel R to feed the liner through pipe P substantially in a manner to avoid application of tension to liner L.

Figure 5:
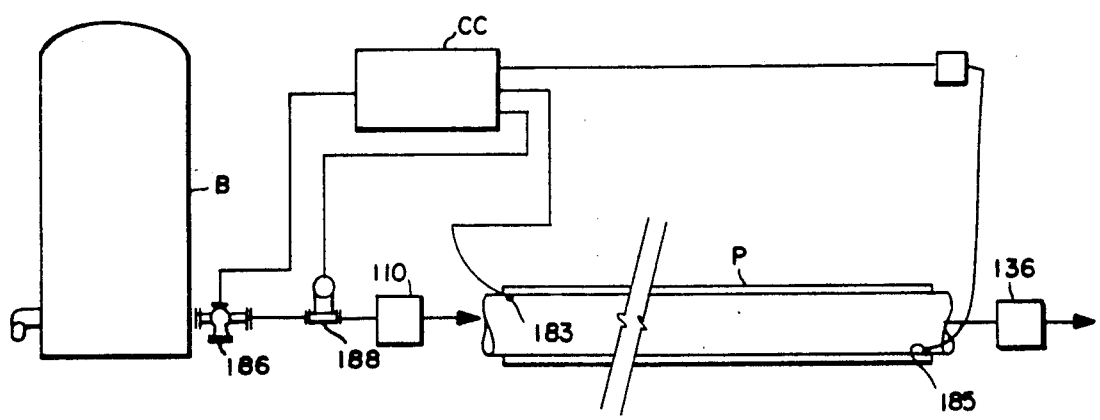
FIG. 5 is a schematic illustration of a method of installation of the pipe lining hereof.

As the liner is being inserted, a boiler B (FIG. 5) mounted on a truck is fired and suitable air and steam connections are made with exhaust manifold 136 at second manhole M2. (Boiler B is illustrated in FIG. 5 at manhole M1 for use in subsequent steps, to be described). When liner L is inserted into pipe P such that its ends extend beyond the ends of pipe P, end injector 170 is fitted over the projecting portion of the liner in manhole M2, as illustrated in FIG. 7. Steam is then injected into end injector 170 to soften the encompassed plastic material forming liner L. Thermocouples 183 and 185 (FIG. 5) are also placed at opposite ends of lining L. Particularly, thermocouple 183 at the inlet end of the lining at manhole M1 is disposed on the inside of lining L while thermocouple 185, at the opposite end of the lining at manhole M2, is disposed between lining L and pipe P, i.e., outside the liner skin. The thermocouples, as illustrated in FIG. 5, are connected to a computerized control CC carried by the vehicle mounting boiler B. A pilot valve 186 and a flow meter vortex system 188, respectively, are provided between boiler B and injection manifold 110. Pilot valve 186 is provided to control the flow of the steam. Flow meter vortex system 188 provides computer CC information concerning the flow rate of the steam supplied liner L.

After steam is applied to the end injector 170, injector 170 is removed from the projecting end of the lining at manhole M2. Re-rounding tool 150 with applied plug 152 is inserted into the end of the liner at manhole M2 to initially reform the deformed lining end to its round shape, the engagement of the lining end with the tapered wall of plug 152 forming a seal at that end of the lining. The end of liner L at manhole M1 is also fitted with a re-rounding tool 150 and it similarly is initially rounded by the insertion of the re-rounding tool. Particularly, in using tool 150, bars 160 are inserted into the lobes 96 and 98 of the U-shaped lining L and the pointed tip is inserted between the apex of the U-shaped lining and the semi-circular base section thereof. Upon forcing the re-rounding tool into the lining by use of a hydraulic ram, not shown, the concave surface of the re-rounding tool causes the apex 100 (FIG. 3) to be displaced outwardly while the remaining surfaces of re-rounding tool 150 cause those surfaces to form in a circular configuration. Upon insertion of the rerounding tool 150 and the plug 152 up to the transition between its cylindrical and tapered surfaces, liner L is then clamped about plug 152, sealing the ends of the liner thereabout. The liner is now in condition to be reinflated to its round shape.

To accomplish this, and with reference to FIGS. 5 and 8, the computerized control CC opens pilot valve 186 and steam flows into the liner at manhole M1. The computer CC is programmed to control the flow of steam such that the temperature of the steam rises in the liner to 240° F. and its pressure to 10 psig. The computer controls the flow of steam and holds the steam in the liner through operation of the pilot valve at a temperature of 240° F. and a pressure of 10 psig for a predetermined time period, i.e., on the order of 15 minutes. It will be appreciated, however, that the lining temperature is below the crystallization melting temperature of the plastic material, e.g., 235° F. for HDPE during this predetermined time period notwithstanding that the steam temperature is higher than the crystallization melting temperature. It will also be appreciated, however, that such time period may vary for different sizes of pipes. Suffice to say, this temperature and pressure is held for a time sufficient such that the pressure reinflates the lining to its round configuration throughout its length, the temperature, of course, facilitating the rounding of the liner by softening the plastic material. The temperature of the plastic lining material during the predetermined time period is intentionally maintained less than the crystallization melting temperature of the pipe lining material such that elongation in a circumferential direction of the liner is substantially eliminated. That is, if the temperature of the lining material was initially increased quickly to a temperature above the crystallization melting temperature, such high temperature would elongate the liner in a circumferential direction such that when the liner neared its round configuration, there would be too much not-yet-rounded material to continue the rounding process. That is, it has been found that the material, if initially heated to a temperature above its crystallization temperature, will pinch or form an inwardly directed rib or projection rather than form into a round shape. By holding the temperature of the material below the crystallization melting temperature and supplying sufficient pressure, i.e., about 10 psig, the liner material will not elongate and will inflate into its round shape against the walls of pipe P.

Once the liner has obtained this round shape, the temperature of the steam input to liner L is raised to an even higher temperature above the crystallization melting temperature, i.e., approximately 260°-265° F. The pressure is also raised to 25 psig. This pressure and temperature are likewise held for a predetermined time period. More particularly, the temperature is held for a time period such that the temperature of the plastic material registered at thermocouple 183 approximates the temperature of the steam input at that end to the liner and the temperature registered at thermocouple 185 at manhole M2 obtains 70% of the temperature registered by thermocouple 183 at manhole M1. That is, it is sufficient for approximately 70% of the mass of plastic material to reach the crystallization melting temperature in order to erase the U-shape memory and restore, activate or bring into prominence the cylindrical memory. Stated differently, approximately 70% of the liner wall thickness will be at a temperature above the crystallization melting temperature and this is sufficient to reactivate the memory of the round shape and inactivate the memory of the U shape. When these temperature conditions are achieved, the computer commences the cool-down process.

Particularly, computer CC cuts the steam supply to liner L and opens the air valve in injection manifold 110 to inject air into the lining. The pressure within liner L is, however, maintained at 25 psig during cool-down. Once the temperature reaches a third predetermined temperature, for example, about 200° F., water is then injected into the lining from injection manifold 110 to cool the liner to a temperature which is a predetermined percentage of ambient temperature, at which time the pipe lining is substantially complete. The various connections to the lining are then disconnected and the water is drained from the liner. The ends of the liner projecting beyond the ends of pipe P are then cut off. It will be appreciated that no adhesive or any other type of materials for adhering the liner to the pipe are necessary, principally because the liner OD is slightly greater than the ID of the pipe. Thus, the pressure of the liner tending to return to its normal round shape because of its round shape memory, is sufficient to create such friction in the pipe as to inhibit or prevent any movement of the lining relative to the pipe.

Figure 14:
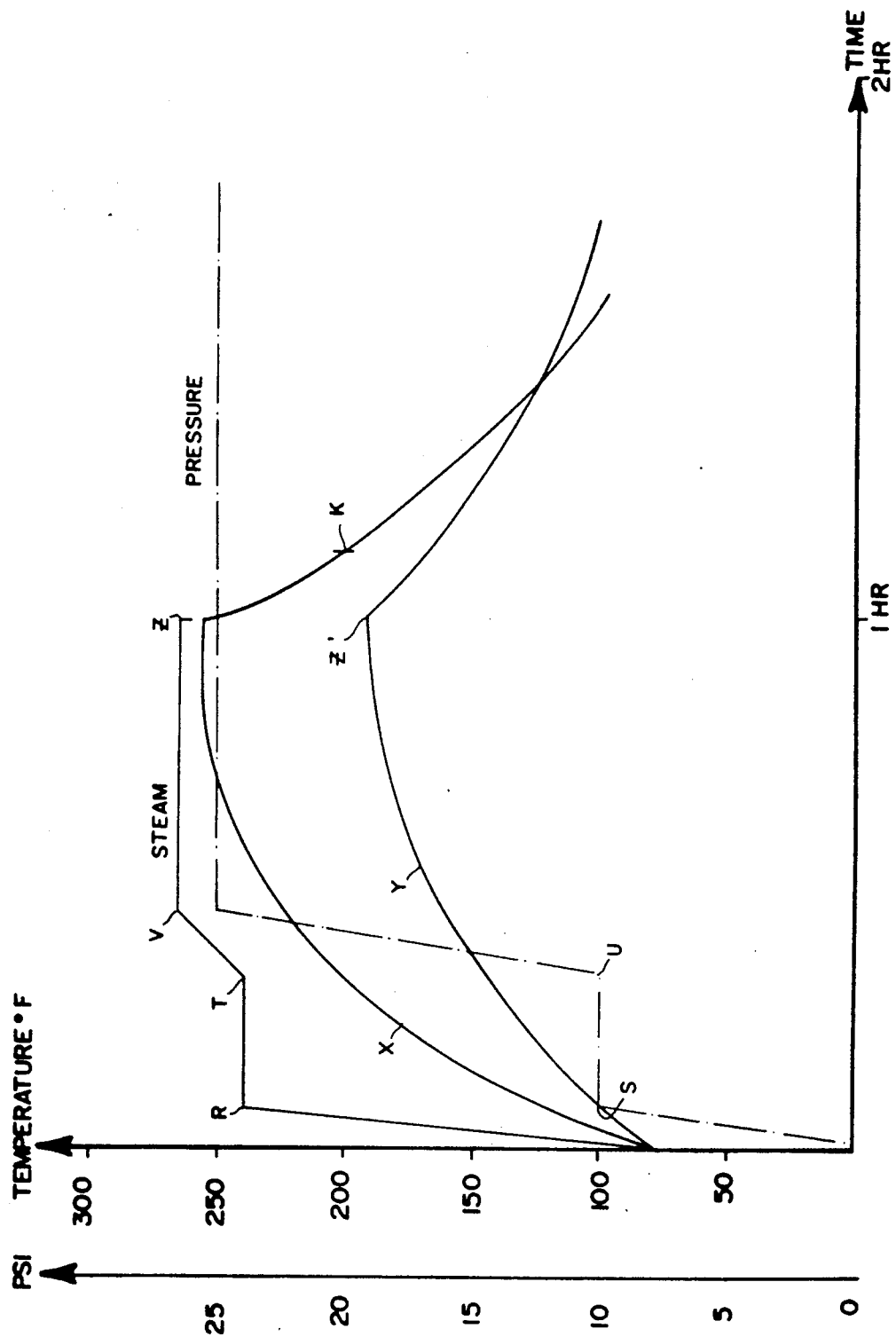
FIG. 14 is a graph of temperature and pressure conditions on the ordinate plotted against time on the abscissa for the installation of the liner into the pipe.

Referring to FIG. 14, there is illustrated a plot of pressure and temperature on the ordinate against time on the abscissa illustrating the installation of the pipe line in accordance with the foregoing description. The solid lines refer to the temperature scale on the ordinate, whereas the dot/dashed lines refers to the pressure scale on the ordinate. It will be seen that during the initial phase, the steam generator, over time, generates a steam temperature of 240° F. input to the liner at point R. Simultaneously, pressure is built up within the liner to 10 psig as indicated at point S. The temperature and pressure conditions are maintained for a predetermined period of time, on the order of 15 minutes, until, at points T and U, respectively, the temperature and pressure are raised to 260°-265° F. and 25 psig, respectively, the latter points being designated V and W. During the rise in temperature and pressure to points R and S, respectively, and the holding of the temperature and pressure through points T and U, respectively, it will be seen that the steam temperature at the inlet end of the lining as measured by thermocouple 183 rises along the curve X, while the temperature of the lining at the downstream end thereof at thermocouple 185 rises at a slower rate, as indicated at Y. Consequently, while the temperature and pressure are maintained for a predetermined time, the actual temperature of the material of the lining does not reach the crystallization melting temperature until the temperature and pressure are raised to points V and W, respectively.

When the steam temperature is raised to point V, i.e., 260°-265° F. and the pressure raised to point W, i.e., 25-26 psig, the temperature of the lining continues to increase, as indicated by curves X and Y, until such time as the thermocouple 183 registers a lining temperature at the inlet approximating the steam temperature and above the crystallization melting point, as indicated at Z. The temperature on the outside of the liner at the opposite end of the liner is indicated at Z' and it will be appreciated that such temperature is a predetermined percentage of the temperature Z at the inlet end of the liner. When those two conditions are met, a predetermined percentage, i.e., preferably about 70%, of the mass of plastic material forming the lining has reached the crystallization melting temperature, at which time the U-shaped memory is erased and the round-shaped memory is activated to maintain the liner in a round configuration within the pipe. At that time, the cooling period commences, with air being ejected to initially cool the liner. Water is thereafter injected once the liner at its inlet end obtains a predetermined temperature, i.e., on the order of 200° F. illustrated at point K.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of installing a thermoplastic liner in a generally cylindrical pipe, comprising the steps of:
   (a) providing a liner formed of thermoplastic material having a non-cylindrical cross-sectional shape with its largest cross-sectional dimension of a value smaller than the inside diameter of said pipe and having a shape memory of a generally cylindrical shape, said liner being responsive to a shape memory activation temperature above the crystallization melting temperature of the thermoplastic liner whereby the liner may be formed into a generally cylindrical configuration;
   (b) pulling said non-cylindrical liner into said pipe such that it extends to the opposite ends of said pipe;
   (c) heating said non-cylindrical liner to a first temperature below said activation temperature;
   (d) pressurizing said non-cylindrical liner to a first pressure to cause said liner to assume a generally cylindrical cross-sectional configuration generally conformal to the interior contours of said pipe when said liner is heated and is at a temperature below said activation temperature;
   (e) holding said liner at said first temperature and said first pressure for a predetermined time period;
   (f) thereafter (1) increasing said temperature in said liner to a second temperature above said activation temperature to raise the temperature of the liner sufficiently to inactivate any memory of the non-cylindrical shape and reactivate the memory of the cylindrical shape and (2) increasing the pressure in said liner to a second pressure above said first pressure, whereby said liner will generally adhere to the generally cylindrical interior contour of said pipe; and
   (g) cooling the liner to a temperature below said activation temperature and removing said second pressure from the liner whereby the liner maintains its generally, cylindrical shape.

2. A method according to claim 1 wherein said liner is formed of a polyethylene material, said first pressure being on the order of about 10 psig and said second temperature and said second pressure being on the order of about 260°–265° F. and about 25–26 psig, respectively.

3. A process according to claim 1 including the step of measuring the temperature of said liner at each of its opposite ends, the step of increasing said temperature in said liner including injecting a heating fluid into said liner at one end thereof, and the step of cooling said liner commences when the temperature of the liner at said one end thereof reaches said second temperature and the temperature at said opposite end of said liner reaches a temperature lower than said second temperature.

4. A process according to claim 1 wherein the step of increasing said temperature in said liner includes the step of injecting a heating fluid into said liner at one end thereof, and the step of cooling said liner commences when the temperature at least at said one end of said liner reaches about said second temperature while maintaining said liner under said second pressure.

5. A process according to claim 4 including injecting steam into said liner at said one end thereof, the step of cooling said liner including injecting air into said liner when said second temperature is obtained in at least said one end of said liner while maintaining said second pressure in said liner whereby the air cools said liner to a third predetermined temperature, and subsequently, injecting water into said liner to cool said liner to a temperature below said third temperature while maintaining said liner under said second pressure.

6. A process according to claim 1 wherein the step of increasing the temperature includes raising the temperature of the liner at one end to said second temperature and raising the temperature of the liner at its opposite end to a predetermined temperature less than said second temperature whereby a sufficient mass of the thermoplastic material reaches the activation temperature of the liner to reactivate its memory of the cylindrical shape and inactivate its memory of the non-cylindrical shape.

7. A process according to claim 6 wherein said sufficient mass of the thermoplastic material is approximately 70% of the mass of the thermoplastic material.

* * * * *